United States Patent
Wolter et al.

(10) Patent No.: US 9,320,123 B2
(45) Date of Patent: Apr. 19, 2016

(54) METHOD FOR OPERATING A HIGH-PRESSURE DISCHARGE LAMP WITH A VARIABLE POWER

(75) Inventors: Kai Wolter, Berlin (DE); Markus Baier, Munich (DE)

(73) Assignee: OSRAM GMBH, Munich (DE)

( * ) Notice: Subject to any disclaimer, the term of this patent is extended or adjusted under 35 U.S.C. 154(b) by 157 days.

(21) Appl. No.: 14/117,376

(22) PCT Filed: May 3, 2012

(86) PCT No.: PCT/EP2012/058087
§ 371 (c)(1),
(2), (4) Date: Nov. 13, 2013

(87) PCT Pub. No.: WO2012/156205
PCT Pub. Date: Nov. 22, 2012

(65) Prior Publication Data
US 2015/0084539 A1 Mar. 26, 2015

(30) Foreign Application Priority Data

May 13, 2011 (DE) .......................... 10 2011 075 784

(51) Int. Cl.
| | | |
|---|---|---|
| H05B 41/16 | (2006.01) | |
| H05B 41/14 | (2006.01) | |
| H05B 37/02 | (2006.01) | |
| H05B 41/292 | (2006.01) | |
| H05B 41/392 | (2006.01) | |
| H05B 41/40 | (2006.01) | |
| G03B 21/20 | (2006.01) | |

(52) U.S. Cl.
CPC ............ *H05B 41/14* (2013.01); *G03B 21/2053* (2013.01); *H05B 37/029* (2013.01); *H05B 41/2928* (2013.01); *H05B 41/3928* (2013.01); *H05B 41/40* (2013.01); *Y02B 20/202* (2013.01)

(58) Field of Classification Search
CPC ....................................................... H05B 37/02
USPC ..................... 315/224, 248, 287, 246, 209 R, 315/DIG. 1–DIG. 4, DIG. 7
See application file for complete search history.

(56) References Cited

U.S. PATENT DOCUMENTS

| 2005/0242741 A1 | 11/2005 | Shiota et al. | |
| 2008/0122376 A1* | 5/2008 | Lys | .............................. 315/192 |

(Continued)

FOREIGN PATENT DOCUMENTS

WO 2010130292 A1 11/2010

OTHER PUBLICATIONS

International Search Report of PCT/EP2012/058087 dated Jul. 13, 2012.

*Primary Examiner* — Minh D A
(74) *Attorney, Agent, or Firm* — Viering, Jentschura & Partner mbB

(57) ABSTRACT

A method for operating a high-pressure discharge lamp with a variable power is disclosed. Said method utilizing at least the following steps: (a) providing high-pressure discharge lamp, which has a nominal operating power; (b) operating the lamp with an instantaneous power, where the instantaneous power lies within relative lower and upper power limits, respectively, and said limits may depend on an average power, and said instantaneous power may lie within a predetermined absolute lower and upper power limit; (c) determining the average power from a one-sided moving average value of the instantaneous power or the exponential smoothing of the instantaneous power of a time segment of predefined length.

16 Claims, 5 Drawing Sheets

(56) References Cited

U.S. PATENT DOCUMENTS

Figure 1A:
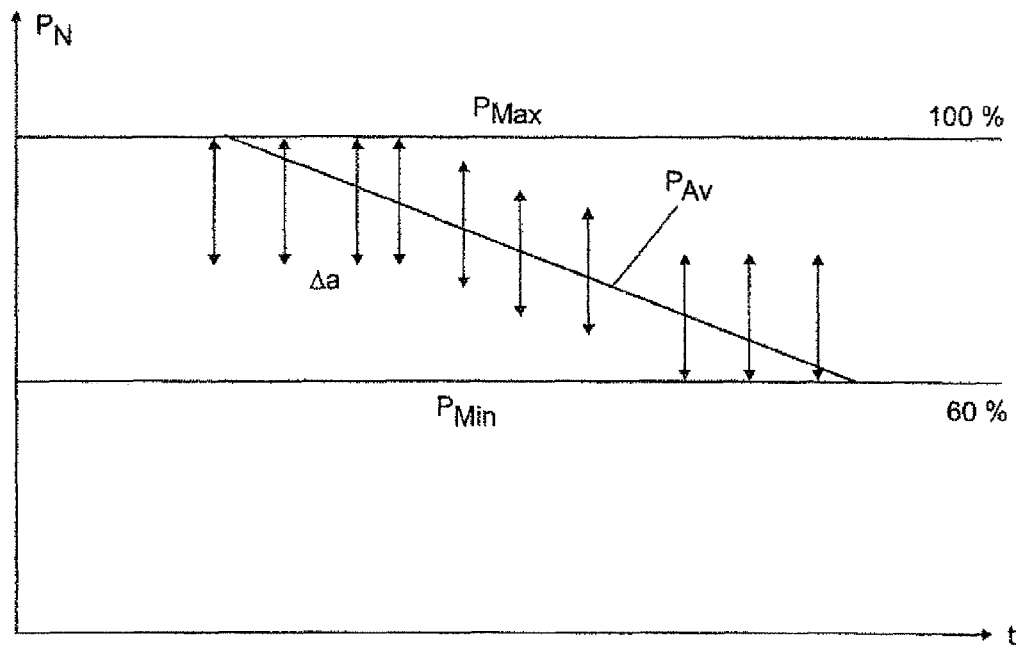

2008/0136977 A1* 6/2008 Harada et al. .............. 348/759
2009/0199036 A1* 8/2009 Warnock et al. ............. 713/501
2010/0253236 A1* 10/2010 Yamada ....................... 315/246
2012/0050351 A1 3/2012 Dobler et al.

* cited by examiner

METHOD FOR OPERATING A HIGH-PRESSURE DISCHARGE LAMP WITH A VARIABLE POWER

RELATED APPLICATIONS

The present application is a national stage entry according to 35 U.S.C. §371 of PCT application No.: PCT/EP2012/058087 filed on May 3, 2012, which claims priority from German application No.: 10 2011 075 784.8 filed on May 13, 2011.

TECHNICAL FIELD

The disclosure relates to a method for operating a high-pressure discharge lamp with a variable power, which method can be used e.g. in video projection systems.

BACKGROUND

Various embodiments relate to a method for operating high-pressure discharge lamps, which method can be used e.g. in video projection systems, and operates the high-pressure discharge lamp with a variable power in order to minimize the energy consumption of the system and to increase the contrast ratio e.g. of the image to be reproduced. Primarily during the reproduction of film material, the image brightness is often very low (e.g. night scenes). In order to increase the dynamic contrast and in order to save energy and also in order to increase the average lamp lifetime by means of operation at on average lower power, therefore, the lamp is in this case intended to be adapted in terms of its power dynamically with the image content image by image. Although this is possible in principle, there is a problem here: if the momentary modulation of the lamp power is too great and the electrode temperature is thus subject to rapid fluctuations, thermal stresses between core pin and electrode filaments give rise to an "uncoiling" of the electrode filaments in the direction of the center of the arc. This leads very rapidly to a reduction of the electrode spacing, which then, as a result of the current limiting usually provided in the operating devices, has the effect that the lamps are operated with an excessively low power and can then also no longer be operated in the normal operating range. This considerably reduces the lifetime of the high-pressure discharge lamp. In addition, the image reproduction of the projection system is disturbed.

One solution is to greatly restrict the permitted modulation range, such that the "uncoiling" of the electrode filaments no longer occurs, or occurs so slowly that it is compensated for by the typical burn-back of the electrodes during the operating period.

Alternatively, only a very slow modulation could be permitted, such that there are only few momentary changes in power, but then a larger range of the modulation depth could be used. However, both solutions greatly restrict the contrast ratio obtainable by the modulation of the power, which is highly undesirable.

SUMMARY

According to various embodiments, a method is disclosed for operating a high-pressure discharge lamp with a variable power, wherein the high-pressure discharge lamp has a nominal power, and is operated with an instantaneous power, wherein the instantaneous power lies within a relative lower and upper power limit, which depends on an average power, and lies within a predetermined absolute lower and upper power limit, wherein the average power is determined from the average value of the instantaneous power. Said average value may be determined as a one-sided moving average value of the instantaneous power or the exponential smoothing of the instantaneous power of a time segment of predefined length. This method may effectively prevent the above-described "uncoiling" of the electrode filaments, without excessively restricting the dynamic range of the high-pressure discharge lamp.

According to various embodiments, the instantaneous power is determined at regular time intervals and the average power is composed of the one-sided moving average value of the last x instantaneous powers. According to various embodiments, the instantaneous power may likewise be determined at regular time intervals and the average power is composed of an exponential smoothing of the last x instantaneous powers.

According to various embodiments, the value x of the last x instantaneous powers of which the average power is composed in this case may lie in the range of between 10<x<600. This measure may provide a sufficient smoothing in conjunction with sufficient dynamic range.

According to various embodiments, the relative lower and upper power limit may be dependent on the average power and on the running voltage $U_B$ of the high-pressure discharge lamp. According to various embodiments, the distance between the relative upper and lower limits is smaller when the running voltage $U_B$ is smaller, and larger when the running voltage $U_B$ is larger. That is to say that the modulation depth may increase when the running voltage $U_B$ is larger, and may decrease when the running voltage $U_B$ is smaller. As a result, according to various embodiments, the growth of the electrode tips can be promoted when an electrode spacing is too large, while it is prevented when an electrode spacing is too small. In this regard it has astonishingly been found that a large modulation depth leads to increased tip growth, while a small modulation depth has no effects on the tip growth.

The According to various embodiments, the relative lower power limit may lie between 1% and 30% of the nominal power below the average power of the high-pressure discharge lamp and the relative upper power limit may lie between 1% and 30% of the nominal power above the average power of the high-pressure discharge lamp. The absolute lower power limit, according to various embodiments, may be between 30% and 80% of the nominal power of the high-pressure discharge lamp and the absolute upper power limit may be between 100% and 130% of the nominal power of the high-pressure discharge lamp.

In a further embodiment, the relative lower and upper power limits may be at equal distances from the average power. However, it is also possible to configure the limits independently of one another and to choose a larger value for the distance between the upper power limit and the average power. According to various embodiments, the light can additionally also be reduced by suitable additional measures (e.g. a shutter). The brightness of the lamp may then rise more rapidly again from a lower level to a brighter level, whereas a reduction of the brightness may be effected more slowly. When reducing the brightness, it may be possible to use the additional measure for an immediate reduction of the brightness. The lamp is slowly controlled downward, which can no longer be perceived, however, as a result of the additional measure. This may not be possible the other way round, however: if the brightness has to be available again immediately, the lamp has to achieve the target brightness significantly more rapidly, which may be achieved by virtue of the greater distance between the upper power limit and the average power.

In accordance with various embodiments, the instantaneous power may be predefined by an external control unit, and the relative upper and lower power limits may be communicated back to the control unit in the event of each change in power. This may provide a reliable and efficient communication between the operating device of the high-pressure discharge lamp and the control unit (e.g. video electronics). According to various embodiments, the communication back of the relative upper and lower power limits can be effected by means of a pulse-width modulated signal or by means of a digital interface. These two variants can be implemented safely and efficiently by means of a microcontroller that may be provided according to various embodiments. In further methods, the relative upper and lower power limits can also be communicated by means of an analog level signal or a frequency signal.

In accordance with a further aspect of the invention, the control unit synchronizes the desired lamp power with external signals, such as, for example, an image signal or an audio signal.

BRIEF DESCRIPTION OF THE DRAWING(S)

Figure 1B:
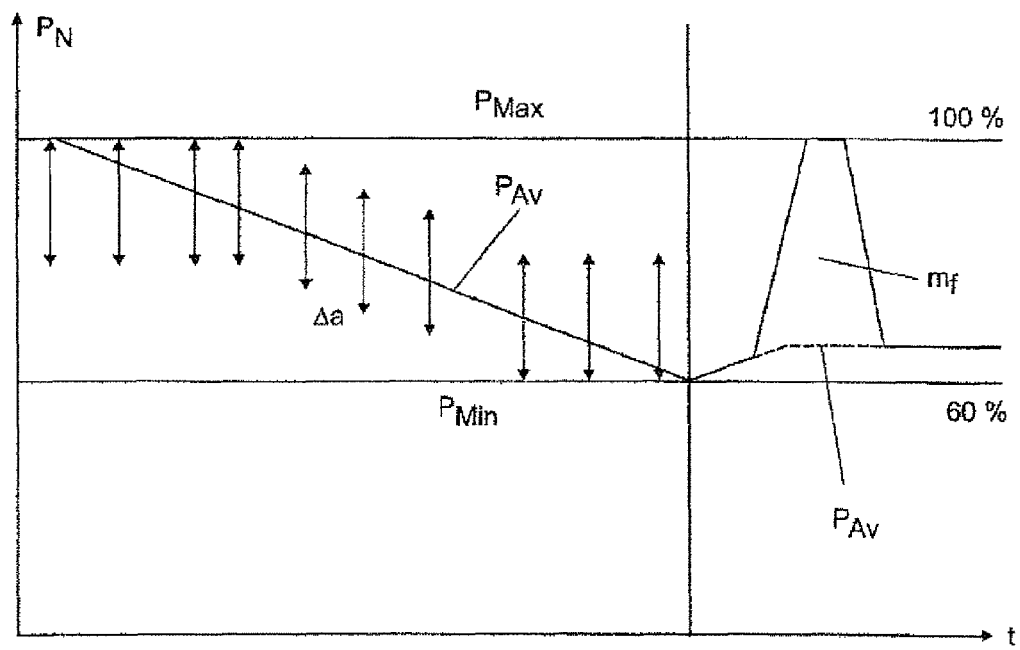
Figure 2:
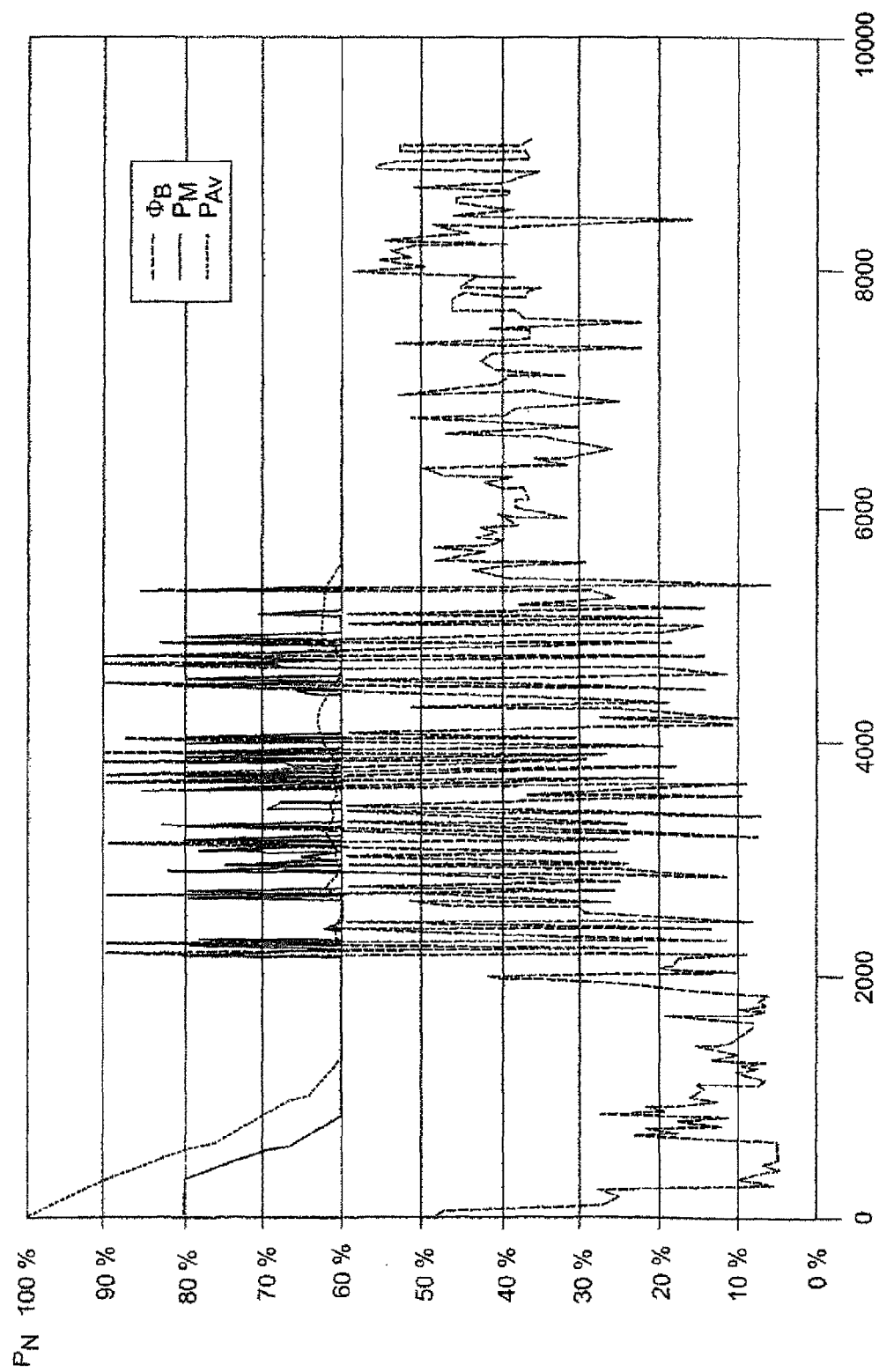
Figure 3:
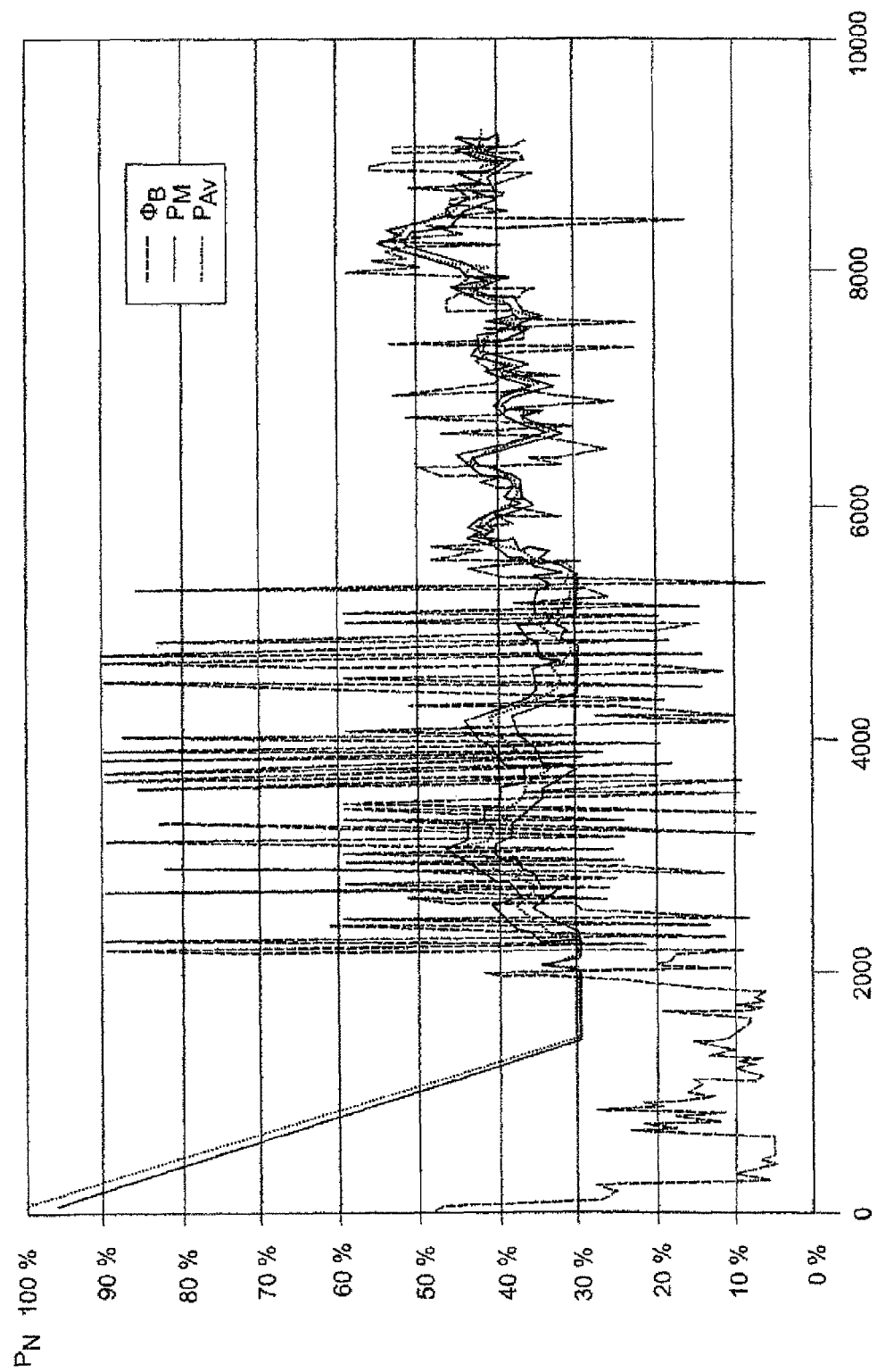
Figure 4:
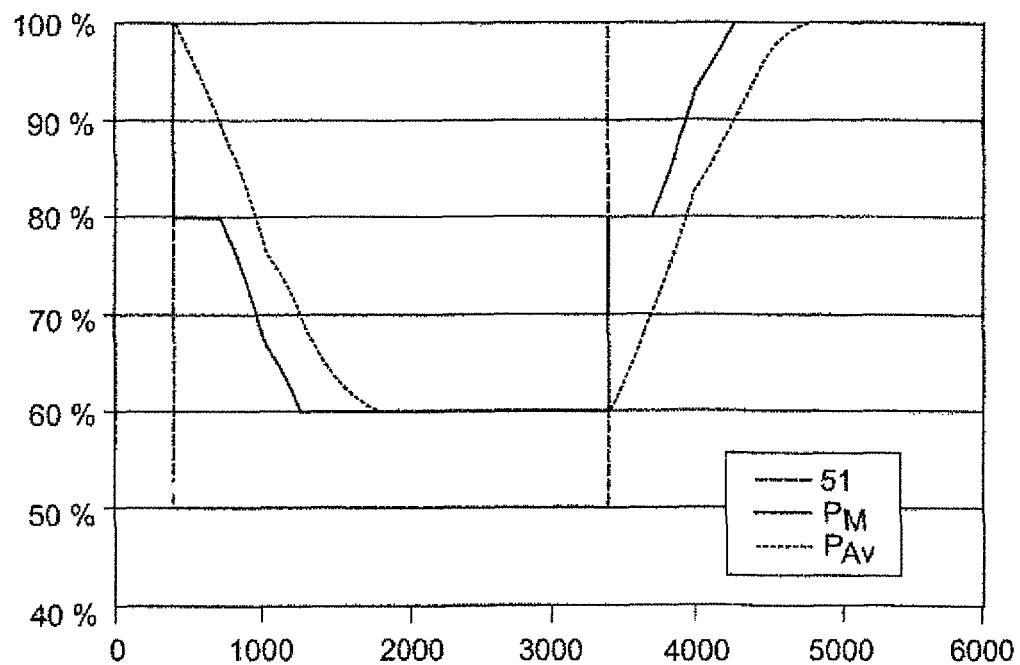
Figure 5:
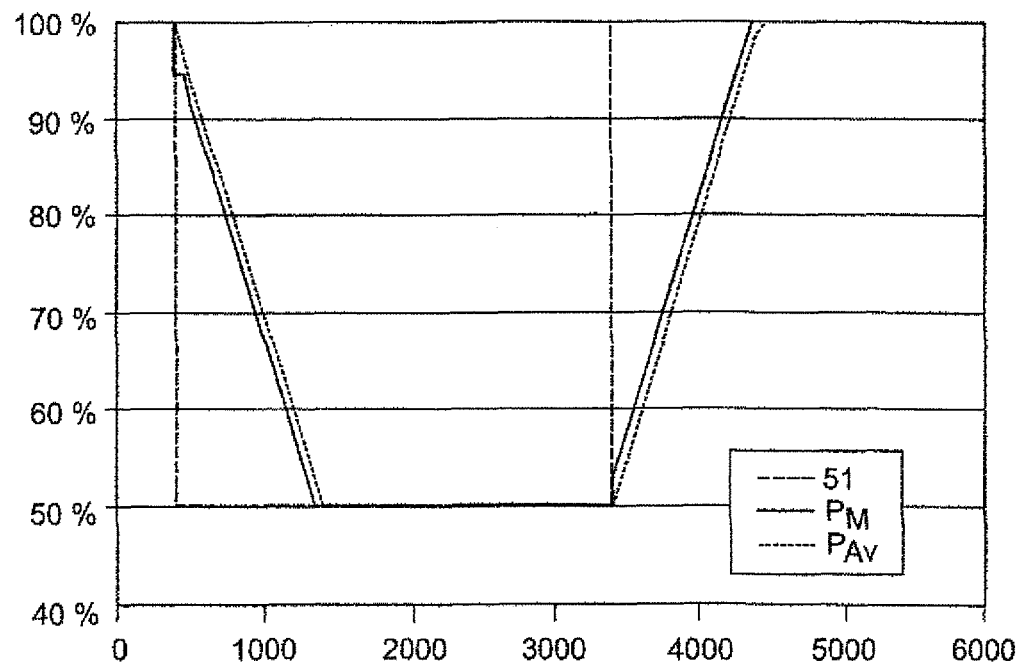
Figure 6:
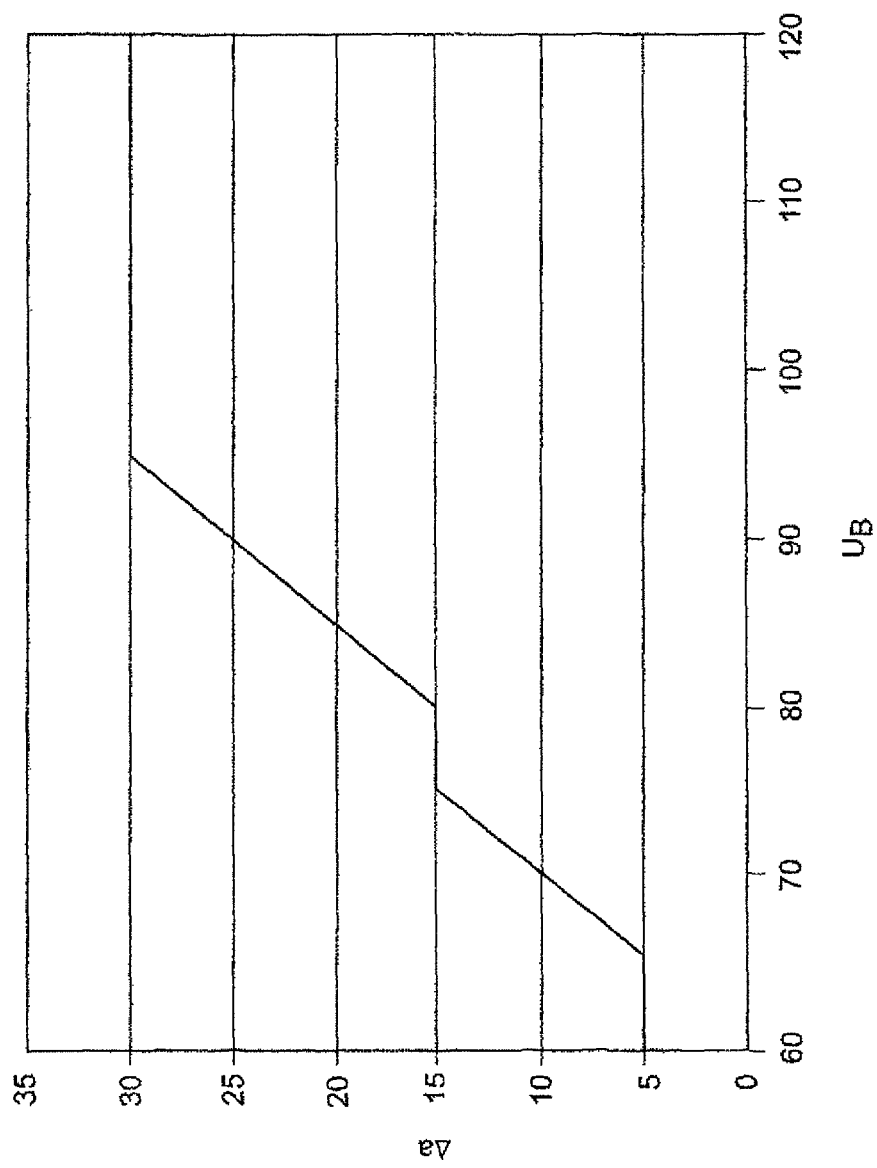

Further advantages, features and details of the disclosure are evident with reference to the following description of exemplary embodiments and with reference to the drawings, in which identical or functionally identical elements are provided with identical reference signs. In the figures:

FIG 1a shows a graph for elucidating the method according to various embodiments, for operating a high-pressure discharge lamp with a variable power, said graph depicting the predetermined absolute lower and upper power limits, and also the average power as a curve and the relative lower and upper power limits, which are dependent on the average power, Fig 1b shows a graph for elucidating the method according to various embodiments, for operating a high-pressure discharge lamp with a variable power, said graph depicting the predetermined absolute lower and upper power limits, and also the average power as a curve, and the relative lower and upper power limits, the dependence of which here is decoupled from the average power at times for a lifetime-prolonging measure, FIG. 2 shows an example of a first embodiment of a method according to various embodiments, with an absolute lower and upper power limit of 60% to 100% and a modulation depth $\Delta_a$ of 20% and an average power whose one-sided moving average value is averaged over 10s, FIG 3 shows an example of a second embodiment of a method according to various embodiments, with an absolute lower and upper power limit of 30% to 100% and a modulation depth $\Delta_a$ of 5% and an average power whose one-sided moving average value is averaged over 2s, FIG. 4 shows a graph with a simple test sequence for the first embodiment of the method according to various embodiments, FIG. 5 shows a graph with the same simple test sequence as in FIG. 4 for the second embodiment of the method according to various embodiments, FIG. 6 shows the graphical representation of the permitted modulation depth $\Delta_a$ (the range between relative lower and upper power limits) as a function of the running voltage $U_B$ of the high-pressure discharge lamp for a third embodiment of the method according to various embodiments, for operating a high-pressure discharge lamp.

DETAILED DESCRIPTION

The following explanations repeatedly use terms which will be briefly explained here:

The nominal power of the high-pressure discharge lamp is understood here to mean the rated power for continuous operation as specified by the manufacturer of the high-pressure discharge lamp. The nominal power of a high-pressure discharge lamp for projection purposes can be e.g. 120W, 150W or 300W.

Hereinafter, instantaneous power is considered to be the power currently present at the high-pressure discharge lamp. In projection applications, the instantaneous power can be calculated at discrete intervals, that is to say e.g. once per image (also called frame). However, the instantaneous power can also be calculated continuously.

Hereinafter, average power PAV is considered to be a power which is averaged over a specific time period. Only real instantaneous powers are averaged, that is to say that the time period extends into the past. The average power PAV can be calculated as a one-sided moving average value, in the case of which the averaging period proceeding from the current point in time extends into the past. The calculation specifications concerning the one-sided moving average value can be found e.g. in the German Wikipedia article "Gleitender Mittelwert" ["Moving Average Value"]

However, the average power PAV can also be calculated by means of an exponential smoothing, in the case of which a weighted average is formed from the last power values and a weighting value. The calculation specifications concerning exponential smoothing can be found e.g. in the German Wikipedia article "Exponentielle Glättung" ["Exponential "].

FIG 1a shows a graph for elucidating the method according to various embodiments, for operating a high-pressure discharge lamp with a variable power, said graph depicting the predetermined absolute lower power limit $P_{Min}$ and the predetermined absolute upper power limit $P_{Max}$. The average power $P_{AV}$ is depicted as a curve, and the relative lower and upper power limits, which are dependent on the average power $P_{AV}$, are depicted as vertical arrows. The range between the lower and upper relative power limits is also designated as the modulation depth $\Delta_a$.

According to various embodiments, the method may be used to increase the contrast in video applications by adapting the instantaneous power of the high-pressure discharge lamp to the current image content. For this purpose, an external control unit, e.g. video electronics, communicates the desired instantaneous power to the operating device operating the high-pressure discharge lamp. In this case, the communication can be effected by means of a digital interface. However, the communication can also be effected by means of a modulated signal input into the operating device. The operating device then sets the desired power at the high-pressure discharge lamp in the context of the instantaneously permitted modulation depth. The modulation depth $\Delta_a$ for the momentary image-by-image modulation (typically 50 Hz to 60 Hz or double that for 3D contents) is restricted to a predetermined value, such that the "uncoiling" of the electrode filaments as described in the introduction does not occur or occurs only very slowly. In order then nevertheless to permit a wider range for the modulation of the power, an additional parameter is introduced: an average power $P_{AV}$ averaged over a longer time period t. The momentary modulation then becomes possible in the permitted range with a predetermined modulation depth always around this average power $P_{AV}$. In other words, there are an upper and a lower relative power limit around said average power $P_{AV}$. Upon approaching the upper and lower absolute power limits ($P_{Max}$, $P_{Min}$), the modulation there remains possible in a range between these fixed limits. The operating device carries out the change in power of the high-pressure discharge lamp, said change being desired by the control unit, in the context of the currently applicable relative limits and then communicates the relative upper and lower power limits back to the control unit for a renewed change in power. In this case, the communication back can likewise be effected by means of a PWM signal or by means of a digital interface.

In this case, the desired lamp power can be synchronized with external signals. In particular, the control unit can synchronize the desired lamp power with an image signal. However, the control unit can likewise synchronize the desired lamp power from an audio signal.

FIG 1b shows a graph for elucidating the method according to various embodiments, for operating a high-pressure discharge lamp with a variable power, said graph depicting the predetermined absolute lower and upper power limits, and depicting the average power $P_{AV}$ as a curve. The dependence of the relative lower and upper power limits is decoupled here from the average power at times for a lifetime-prolonging measure, as can be seen in the right-hand part of the graph. The permitted excursion and its start value, the midpoint of the permitted range, can additionally be time-dependent. If a lifetime-prolonging measure currently present requires lamp operation at nominal power or takes effect ideally only in that case, then the midpoint $m_f$ of the permitted excursion can be decoupled from the average power $P_{AV}$, increased continuously to $P_{Max}$ and be reduced again to the desired average target power $P_{AV}$ after the end of the measure. This is illustrated in the right-hand region of FIG. 1b. In this case, the average power $P_{AV}$ does not necessarily follow the midpoint $m_f$ of the permitted excursion.

FIG. 2 shows an example of a method according to various embodiments, with an absolute lower power limit $P_{Min}$ of 60% of the nominal power and an absolute upper power limit $P_{Max}$ of 100% of the nominal power and a modulation depth $\Delta_a$ of the power of 20% of the nominal power. The average power $P_{AV}$ is averaged as a one-sided moving average value over 10s. The maximum range of the instantaneous power is thus defined by 100% of the nominal power ($P_{Max}$) to 60% of the nominal power ($P_{Min}$). The momentary maximum image-by-image modulation, that is to say the modulation depth $\Delta_a$, is restricted to 20% of the nominal power. The one-sided moving average value of the average power $P_{AV}$ is determined as follows: $P_{AV}=(P1+P2+P3+P4+\ldots+Pn)/n$, where n is chosen such that the averaging takes place over 10s, and the instantaneous powers P1 to Pn are determined in each case for an image. At an image refresh frequency of the frame range of e.g. 60 Hz, n=600. A momentary brightness adaptation is thus possible at any time. With persistent image brightness below the minimum permitted power, the instantaneous power decreases to the lower permitted power $P_{Min}$ after approximately 15s as a result of the algorithm. In this case, the average value starts initially at 100%, that is to say at nominal power.

FIG. 3 shows an example of a method according to various embodiments, with an absolute lower power limit $P_{Min}$ of 30% and an absolute upper power limit $P_{Max}$ of 100%, The modulation depth $\Delta_a$ of the average power $P_{AV}$ is 5% in this embodiment. The one-sided moving average value is averaged only over 2 s in the second embodiment. The maximum range of the instantaneous power is thus adjustable from 100% of the nominal power ($P_{Max}$) to 30% of the nominal power ($P_{Min}$). The momentary maximum image-by-image modulation, that is to say the modulation depth ($\Delta_a$), is restricted to only 5%. The average power is determined by a one-sided moving average value: $P_{AV}=(P1+P2+P3+P4+\ldots+Pn)/n$, where n is chosen such that the averaging takes place over $\approx 2$ s. At an image refresh rate of 60 Hz, n is then equal to 120. The momentary adaptation is relatively small, but with persistent image brightness below the minimum permitted power $P_{Min}$ the applied power decreases to the lower permitted power $P_{Min}$ after approximately 22 s as a result of the algorithm. The average value starts initially at 100%.

FIG. 4 shows a graph with a simple test sequence of the method according to various embodiments. The test sequence 51 here consists of a brightness jump from 100% of the image brightness to 50% of the image brightness and back. The image brightness is plotted over the image numbers. The curve $P_M$ is the plotted instantaneous power of the lamp. The initial power jump from 100% of the nominal power to 80% of the nominal power on account of the permitted modulation depth $\Delta_a$ of 20% of the nominal power can readily be seen. The curve $P_{AV}$ designates the average power $P_{AV}$, which follows the instantaneous power $P_M$ only after some time on account of the one-sided moving average value calculation. Starting from the jump in the instantaneous power to 80% of the nominal power, the instantaneous power remains at 80% until the average power $P_{AV}$ has reached 90% of the nominal power.

The instantaneous power $P_M$ then decreases at the same rate as the average power $P_{AV}$, with the difference that it is smaller than the average power $P_{AV}$ by the permitted 10%. The instantaneous power $P_M$ behaves analogously in the event of the jump in image brightness from 60% of the nominal power to 100% of the nominal power of the high-pressure discharge lamp. The minimum image brightness of 60% is attained here after approximately 900 frames, corresponding to approximately 15 s (at 60 frames/s).

FIG. 5 shows a graph with the same simple test sequence 51 as in FIG. 4 of the method according to various embodiments. For the sake of better comparability, the jump in image brightness is the same as in the previous example in FIG. 4. As a result of the different parameters concerning the modulation depth $\Delta_a$ and the one-sided moving average value, the instantaneous power $P_M$ moves differently here than in the first embodiment. At the start, the instantaneous power $P_M$ decreases by the permitted modulation depth $\Delta_a$ of 5%. It remains here briefly and then decreases further with the average power $P_{AV}$. Since the average power is averaged only over 2 seconds in the second embodiment, it decreases at a linear rate. The minimum image brightness of 50% is attained here after approximately 1300 frames, corresponding to approximately 22 s (at 60 frames).

FIG. 6 shows the graphical representation of the permitted modulation depth $\Delta_a$ (the range between relative lower and upper power limits) as a function of the running voltage $U_B$ (60V-120V) of the high-pressure discharge lamp for a third embodiment of the method according to various embodiments for operating a high-pressure discharge lamp. The modulation depth $\Delta_a$, is analogous to the previous embodiments, but the modulation depth $\Delta_a$, is additionally dependent on the running voltage $U_B$ of the high-pressure discharge lamp. At lower running voltages of e.g. 60V, the modulation depth $\Delta_a$ is small, e.g. 5%, in order to prevent a further growing together of the electrodes of the high-pressure discharge lamp. At high running voltages, the permitted modulation depth $\Delta_a$ is larger, e.g. 30%, since here a growing together of the electrodes may even be desirable. The permitted modulation depth can be linear, or alternatively in steps or an arbitrary curve shape.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

LIST OF REFERENCE SIGNS

55 Image brightness
$P_{AV}$ Average power
$P_{Max}$ Absolute upper power limit
$P_{Min}$ Absolute lower power limit
$\Delta a$ Modulation depth
$m_f$ Midpoint
$\Phi_B$ Image brightness
$P_M$ Instantaneous power
$U_B$ Running voltage of the high-pressure discharge lamp.

The invention claimed is:

1. A method for operating a high-pressure discharge lamp with a variable power, wherein the high-pressure discharge lamp has a nominal power, and is operated with an instantaneous power, wherein the instantaneous power
   lies within a relative lower and upper power limit, which depends on an average power, and
   lies within a predetermined absolute lower and upper power limit, wherein the average power is determined from the one-sided moving average value of the instantaneous power or the exponential smoothing of the instantaneous power of a time segment of predefined length.

2. The method as claimed in claim 1, characterized in that the instantaneous power is determined at regular time intervals and the average power is composed of the one-sided moving average value of the last x instantaneous powers.

3. The method as claimed in claim 2, characterized in that x lies in the following range: 10<x<600.

4. The method as claimed in claim 1, characterized in that the instantaneous power is determined at regular time intervals and the average power is composed of an exponential smoothing of the last x instantaneous powers.

5. The method as claimed in claim 4, characterized in that x lies in the following range: 10<x<600.

6. The method as claimed in claim 1, characterized in that the relative lower and upper power limit is dependent on the average power and on the running voltage of the high-pressure discharge lamp.

7. The method as claimed in claim 6, characterized in that the distance between the relative upper and lower limits is smaller when the running voltage is smaller in and larger when the running voltage is largest.

8. The method as claimed in claim 1, characterized in that the relative lower power limit lies between 1% and 30% of the nominal power below the average power and the relative upper power limit lies between 1% and 30% of the nominal power above the average power.

9. The method as claimed in claim 1, characterized in that the distance between the relative lower power limit and the average power is of the same magnitude as the distance between the average power and the relative upper power limit.

10. The method as claimed in claim 1, characterized in that the distance between the relative lower power limit and the average power ($P_{Av}$) is of a different magnitude, and in particular smaller, compared with the distance between the average power ($P_{Av}$) and the relative upper power limit.

11. The method as claimed in claim 1, characterized in that the absolute lower power limit lies between 30% and 80% of the nominal power and the absolute upper power limit lies between 100% and 130% of the nominal power.

12. The method as claimed in claim 1, characterized in that the desired instantaneous power is predefined by an external control unit, and the relative upper and lower power limits are communicated back to the control unit in the event of each change in power.

13. The method as claimed in claim 12, characterized in that the communication back is effected by means of a pulse-width-modulated signal, an analog level signal, a frequency or a digital signal.

14. The method as claimed in claim 13, characterized in that the control unit synchronizes the desired lamp power with external signals.

15. The method as claimed in claim 14, characterized in that the control unit synchronizes the desired lamp power with an image signal.

16. The method as claimed in claim 14, characterized in that the control unit synchronizes the desired lamp power from an audio signal.

* * * * *

UNITED STATES PATENT AND TRADEMARK OFFICE
CERTIFICATE OF CORRECTION

PATENT NO. : 9,320,123 B2
APPLICATION NO. : 14/117376
DATED : April 19, 2016
INVENTOR(S) : Kai Wolter et al.

It is certified that error appears in the above-identified patent and that said Letters Patent is hereby corrected as shown below:

IN THE SPECIFICATION

Column 2, line 40: Please delete the first word "The" at the beginning of the sentence.

Column 4, line 35: Please delete the last word of the sentence, "["Exponential"]" and write the words "["Exponential Smoothing"]" in place thereof.

Column 5, line 63: Please delete the "," between "100%" and the word "The", and write a "." in place thereof.

Column 6, line 53: Please delete the last word of the sentence "frames" and write the words "frames/s" in place thereof.

Column 6, line 57 and 58: Please delete the words "for a third embodiment".

Column 6, line 60 and 61: Please delete the "," in front of the word "is".

Signed and Sealed this
Twenty-eighth Day of June, 2016

Michelle K. Lee
*Director of the United States Patent and Trademark Office*